(12) United States Patent
Kahle (10) Patent No.: US 11,143,537 B2
(45) Date of Patent: Oct. 12, 2021

(54) DEVICE HAVING A SEALING ELEMENT FOR SEALING A GAP, METHOD FOR OPERATING SUCH A DEVICE, MEASURING SYSTEM, AND METERING SYSTEM

(71) Applicant: Schenck Process Europe GmbH, Darmstadt (DE)

(72) Inventor: Jens Kahle, Dreieich (DE)

(73) Assignee: Schenck Process Europe GmbH, Darmstadt (DE)

( * ) Notice: Subject to any disclaimer, the term of this patent is extended or adjusted under 35 U.S.C. 154(b) by 0 days.

(21) Appl. No.: 16/883,346

(22) Filed: May 26, 2020

(65) Prior Publication Data
US 2020/0284635 A1   Sep. 10, 2020

Related U.S. Application Data

(63) Continuation of application No. PCT/EP2018/078828, filed on Oct. 22, 2018.

(30) Foreign Application Priority Data

Nov. 23, 2017 (DE) ...................... 10 2017 010852.8

(51) Int. Cl.
*G01F 1/84* (2006.01)
*G01F 1/10* (2006.01)

(52) U.S. Cl.
CPC .............. *G01F 1/8409* (2013.01); *G01F 1/10* (2013.01); *G01F 1/8454* (2013.01); *F16C 2370/00* (2013.01)

(58) Field of Classification Search
CPC . G01F 1/10; G01F 1/80–8409; F16C 33/7816
See application file for complete search history.

(56) References Cited

U.S. PATENT DOCUMENTS

| 4,700,578 A | 10/1987 | Fassbinder |
| 5,088,331 A | 2/1992 | Fassbinder |

(Continued)

FOREIGN PATENT DOCUMENTS

| CN | 102472651 A | 5/2012 |
| DE | 102 53 078 B3 | 4/2004 |

(Continued)

OTHER PUBLICATIONS

Indian office action dated Feb. 24, 2021 in corresponding application 202037010943.

*Primary Examiner* — Erika J Villaluna
(74) *Attorney, Agent, or Firm* — Muncy, Geissler, Olds & Lowe, P.C.

(57) ABSTRACT

An apparatus having a shaft, a bearing sleeve for rotatably supporting the shaft, a housing, in which at least one part of the bearing sleeve is arranged, and a sealing element, which seals a gap between a wall of the housing and the bearing sleeve. The sealing element divides the gap gas-tight into a first partial space adjacent to the front side of the sealing element and a second partial space adjacent to the back side of the sealing element, the sealing element having a flexible part, which is in contact with the wall of the housing and/or the bearing sleeve, and the housing having a first barrier gas inlet for introducing barrier gas into the first partial space as well as a second barrier gas inlet for introducing barrier gas into the second partial space.

19 Claims, 4 Drawing Sheets

(56) References Cited

U.S. PATENT DOCUMENTS

| | | |
|---|---|---|
| 7,077,013 B2 | 7/2006 | Friedrich |
| 7,168,328 B2 | 1/2007 | Kahle |
| 7,614,311 B2 | 11/2009 | Kahle |
| 8,677,833 B2 | 3/2014 | Kahle |

FOREIGN PATENT DOCUMENTS

| | | | | |
|---|---|---|---|---|
| DE | 10 2004 060 045 B4 | 11/2006 | | |
| EP | 0 196 440 A1 | 10/1986 | | |
| EP | 1619481 A1 | 1/2006 | | |
| JP | 63106326 A | * | 5/1988 | ............. F02B 41/10 |
| WO | WO 2006/063774 A1 | 6/2006 | | |

* cited by examiner

DEVICE HAVING A SEALING ELEMENT FOR SEALING A GAP, METHOD FOR OPERATING SUCH A DEVICE, MEASURING SYSTEM, AND METERING SYSTEM

This nonprovisional application is a continuation of International Application No. PCT/EP2018/078828, which was filed on Oct. 22, 2018, and which claims priority to German Patent Application No. 10 2017 010 852.8, which was filed in Germany on Nov. 23, 2017, and which are both herein incorporated by reference.

BACKGROUND OF THE INVENTION

Field of the Invention

The present invention relates to an apparatus, which comprises a shaft, a bearing sleeve surrounding at least one part of the shaft for rotatably supporting the shaft, a housing, in which at least one part of the bearing sleeves is arranged, and a sealing element, which seals a gap between a wall of the housing and the bearing sleeve and which has a front side and a back side. The invention further relates to a method for operating an apparatus of this type, a measuring system comprising an apparatus of this type and a dosing system comprising an apparatus of this type.

Description of the Background Art

An apparatus of the type mentioned at the outside is known, for example from DE 10 2004 060 045 B4, which corresponds to U.S. Pat. No. 7,614,311, which is incorporated herein by reference, and from DE 102 53 078 B3, which corresponds to U.S. Pat. No. 7,168,328, which is incorporated herein by reference. The sealing element, which seals the gap between the bearing sleeve and the wall of the housing, is used in the particular apparatus to prevent a penetration of contaminating particles, in particular of bulk material particles, into an interior of the housing adjacent to the back side of the sealing element. In particular, the sealing element is intended to help avoid one or multiple components of the apparatus, for example a bearing disposed in the housing and/or a drive element, from becoming damaged due to contaminating particles.

It is provided in the conventional art to integrate the sealing element into a roller bearing or to design the sealing element as an O ring seal. The conventional art, however, has the disadvantage that a penetration of contaminating particles into the interior of the housing is not reliably preventable, in particular if the front side of the sealing element is subjected to an elevated operating pressure of, for example, 1.5 bar (absolute).

SUMMARY OF THE INVENTION

It is therefore an object of the present invention to provide an apparatus of the type mentioned at the outset to enable at least one partial interior of the housing to be reliably protected against the penetration of contaminating particles.

The apparatus according to the invention comprises a shaft, a bearing sleeve surrounding at least one part of the shaft for rotatably supporting the shaft, a housing, in which at least one part of the bearing sleeve is arranged, and a sealing element, which seals a gap between a wall of the housing and the bearing sleeve and which has a front side and a back side. The sealing element divides the gap gas-tight into a first partial space adjacent to the front side of the sealing element and a second partial space adjacent to the back side of the sealing element. The sealing element also has a flexible part, which is in contact with the wall of the housing and/or with the bearing sleeve. The housing has a first barrier gas inlet for conducting barrier gas into the first partial space as well as a second barrier gas inlet for conducting barrier gas into the second partial space.

A barrier gas under elevated pressure may be introduced into the first partial space via the first barrier gas inlet. The gas pressure of the barrier gas in the first partial space may prevent particles, for example bulk material particles, from penetrating the first partial space via an opening of the housing. The barrier gas pressure is advantageously set for this purpose in such a way that the barrier gas pressure in the first partial space is above the pressure prevailing in the surroundings of the housing. This makes it possible to prevent the particles from penetrating the first partial space even if particles are fed past the housing under an elevated pressure.

An advantage of the flexible part of the sealing element is that the flexible part is adaptable to the diameter of the shaft and/or to the width of the gap between the wall of the housing and the bearing sleeve, due to its flexibility.

The flexible part permits the sealing element to seal the gap between the wall of the housing and the bearing sleeve dust- and gas-tight.

The second barrier gas inlet may be used to additionally introduce the barrier gas into the second partial space. In this way, it is possible to prevent the flexible part of the sealing element from deforming, due to an elevated barrier gas pressure in the first partial space. Such a pressure-induced deformation of the flexible part of the sealing element may result, for example, in that the flexible part of the sealing element rests against the bearing sleeve in such a way that the flexible part of the sealing element applies an undesirable friction/braking torque to the bearing sleeve during the operation of the apparatus.

In the case of an interruption or a failure of the barrier gas supply to the first (and possibly the second) partial space, a penetration of contaminating particles from the first partial space into the second partial space may be reliably prevented with the aid of the sealing element. In particular, components of the apparatus which are disposed in the second partial space or in an interior of the housing adjacent to the second partial space may thus be protected against contaminants with the aid of the sealing element.

The functionality of the apparatus may be ensured over a long period of time with the aid of the two barrier gas inlets and the sealing element, even under adverse operating conditions, in particular at high operating pressures.

The bearing sleeve is preferably rotatably supported in the housing. A rotation of the bearing sleeve relative to the housing is facilitated thereby. Moreover, the rotatable support of the bearing sleeve makes it possible to drive the bearing sleeve and the shaft in such a way that the bearing sleeve and the shaft rotate at the same or at essentially the same angular velocity. In this way, it is possible to achieve that no or only negligible friction forces occur between the shaft and the bearing sleeve during a rotation of the shaft.

The apparatus advantageously comprises at least one bearing for rotatably supporting the bearing sleeve in the housing. This bearing is advantageously arranged between the bearing sleeve and the wall of the housing. It is also advantageous if this bearing is designed as a radial bearing. The bearing may be, for example, a roller bearing.

The bearing sleeve is preferably inserted through the aforementioned sealing element.

It is also preferred if the flexible part of the sealing element is in contact with the bearing sleeve along a circumferential line of the bearing sleeve.

At least one of the two barrier gas inlets—for example, the second barrier gas inlet—may include a filter element for filtering the barrier gas. With the aid of the filter element, it is possible to prevent an introduction of contaminants into the first or second partial space along with the barrier gas. In particular, the two barrier gas inlets may each include a filter element for filtering the barrier gas.

The sealing element can have a fastening piece and a sealing piece connected to the fastening piece. The sealing piece preferably forms the flexible part of the sealing element. The fastening piece is furthermore preferably fastened to the aforementioned wall of the housing.

The fastening piece may contain, for example, a metal, in particular high-grade steel, or be made from a metal. The sealing piece can be manufactured from an elastically deformable material. For example, the sealing piece may contain an elastomer, in particular silicone, or be made from an elastomer.

The fastening piece can have an axially symmetrical shape. The sealing piece preferably has a first section as well as a second section connected to the first section. The first section of the sealing piece may have, for example, a hollow cylindrical design. The second section of the sealing piece may have, for example, a corrugated ring shape. Moreover, the first and second sections of the sealing piece may be designed to form a single piece with each other.

The fastening piece can have a larger outer diameter as well as a larger inner diameter than the sealing piece.

In addition, the sealing piece may have a section which is disposed in a groove of the fastening piece in a form-fitting manner. Due to the form fit, a strong connection between the fastening piece and the sealing piece may be achieved.

The housing has an opening, through which the shaft is inserted. The first partial space may be connected to the surroundings of the housing through this opening. The barrier gas introduced into the first partial space via the barrier gas inlet may preferably flow out of the housing via this opening. In one advantageous variant of the invention, the apparatus comprises a floating ring for sealing this opening.

The apparatus preferably comprises at least one bearing arranged between the shaft and the bearing sleeve, with the aid of which the shaft is rotatably mounted in the bearing sleeve. This bearing is advantageously designed as a radial bearing. The bearing may be, for example, a roller bearing.

Moreover, the apparatus may include a rotatably supported, bladed measuring wheel for deflecting a material flow. The measuring wheel is advantageously rigidly connected to the shaft. The front side of the sealing element preferably faces the measuring wheel.

The apparatus may also include another sealing element. The additional sealing element is preferably disposed between the bearing sleeve and the shaft. For example, a gap between the bearing sleeve and the shaft may be sealed with the aid of the additional sealing element.

It is also advantageous if the apparatus is connected to a compressor, via which the apparatus may be supplied with a barrier gas. The two barrier gas inlets of the apparatus are each advantageously connected to the compressor with the aid of a separate gas line or with the aid of a shared gas line.

The housing preferably has a barrier gas channel, via which the two barrier gas inlets are connected to each other. The two barrier gas inlets may preferably be supplied with the barrier gas via the barrier gas channel.

The apparatus may be a measuring instrument for measuring a mass flow rate of a material flow, in particular a bulk material flow, according to the Coriolis principle. In this case, the apparatus advantageously includes a force measuring device, which is configured to generate a measuring signal dependent on the mass flow rate of the material flow. The force measuring device may comprise, in particular, one or multiple strain gauges. For example, the force measuring device may be designed as a double bending beam transducer.

As mentioned at the outside, the invention relates to a method for operating an apparatus of the type according to the invention.

In the method according to the invention, a barrier gas is introduced into the housing via the two barrier gas inlets of the apparatus, so that the same or essentially the same gas pressure is applied to the back side of the sealing element, which seals the gap between the wall of the housing and the bearing sleeve, as is applied to the front side of the sealing element.

The method is based on the consideration that a possible deformation of the flexible part of the sealing element, which is based on an elevated barrier gas pressure in the first partial space, may result in the fact that the sealing element rests against the bearing sleeve in such a way that the sealing element applies an undesirable friction/braking torque to the bearing sleeve during the operation of the apparatus. For example, if the apparatus is used as a measuring instrument for measuring a mass flow rate of a material flow, a friction/braking torque of this type may result in measurement errors.

To prevent the flexible part of the sealing element from being deformed due to an elevated barrier gas pressure in the first partial space, the barrier gas is also introduced into the second partial space via the second barrier gas inlet. In this way, the same gas pressure is applied to the front side and the back side of the sealing element, so that a pressure-induced deformation of the sealing element is avoided.

The invention furthermore relates to a measuring system, as mentioned at the outset. The measuring system according to the invention comprises an apparatus of the type according to the invention, the apparatus being used to measure a mass flow rate of a material flow and comprising a force measuring device of the type mentioned above. The measuring system according to the invention also comprises an evaluation unit, which is configured to ascertain the mass flow rate of the material flow, using the measuring signal of the force measuring device.

In addition to the measuring signal of the force measuring device, one or multiple additional measuring signals may also be used in ascertaining the mass flow rate of the material flow, for example a measuring signal dependent on the rotational speed of the measuring wheel, and/or one or multiple other parameters.

The evaluation unit of the measuring system is advantageously equipped with a data memory for storing software as well as with a processor for running the software. Software, which is executable by the processor of the evaluation unit, is preferably stored in the data memory of the evaluation unit. This software advantageously enables the evaluation unit to ascertain the mass flow rate of the material flow, using the measuring signal of the force measuring device.

The invention further relates to a dosing system, as mentioned at the outset. The dosing system according to the invention comprises an apparatus of the type according to the invention, the apparatus being used to measure a mass flow rate of a material flow and comprising a force measuring device of the type mentioned above. The dosing system according to the invention also comprises a feed unit for conducting the material flow into the apparatus, as well as an evaluation unit, which is configured to set a defined mass flow rate of the material flow by controlling or regulating a manipulated variable of the feed unit, using the measuring signal of the force measuring device.

Manipulated variables may be, for example the rotational speed of a feed element, conveyor screw, cell wheel or conveyor belt, the frequency and/or vibration severity of a discharge chute or the opening angle of a rotary valve of a feed unit.

The evaluation unit of the dosing system is advantageously equipped with a data memory for storing software as well as with a processor for running the software. Software which is stored in the data memory of the evaluation unit of the dosing system and is executable by the processor of the evaluation unit advantageously enables the evaluation unit to set a defined mass flow rate of the material flow by controlling or regulating the manipulated variable of the feed unit, using the measuring signal of the force measuring device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
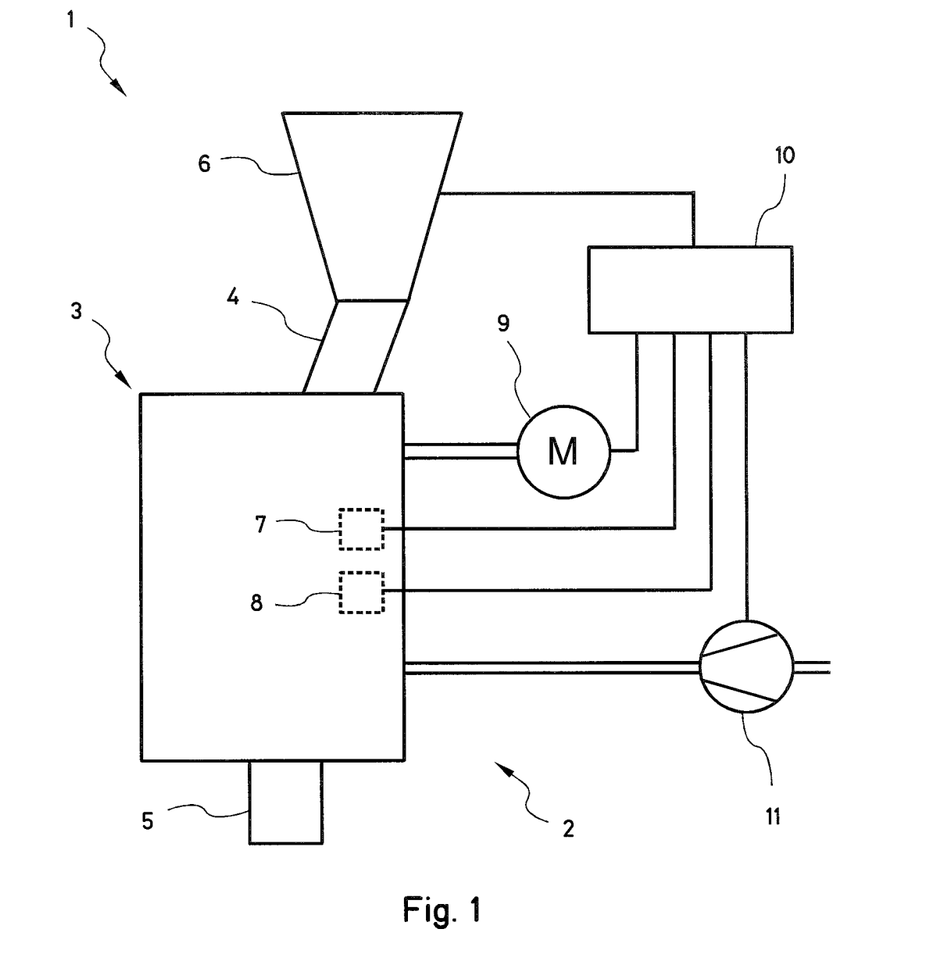
FIG. 1 shows a dosing system comprising a feed unit, a measuring instrument, an evaluation unit, a compressor and a drive unit in a schematic representation.

FIG. 1 shows a dosing system 1 in a schematic representation. Dosing system 1 comprises a measuring system 2, including an apparatus 3 for measuring a mass flow rate of a material flow according to the Coriolis principle. Apparatus 3 for measuring the mass flow rate of a material flow is referred to below as "measuring instrument" for the sake of simplicity. The material flow may be, in particular, a bulk material flow. In particular, the mass flow rate of a material flow made up of free-flowing bulk material particles, for example, coal dust, may thus be measured with the aid of measuring instrument 3.

Measuring instrument 3 has, among other things, an inlet 4 and an outlet 5. Inlet 4 of measuring instrument 3 is connected to a feed unit 6 of a dosing system 1. In addition, measuring instrument 3 is equipped with a force measuring device 7, for example a double bending beam transducer, and a rotational speed measuring device 8.

Dosing system 1 further comprises a drive unit 9 for driving measuring instrument 3. Drive unit 9 may be designed, for example, as an electric motor.

In addition to measuring instrument 3, measuring system 2 also comprises an evaluation unit 10, which is connected to drive unit 9, force measuring device 7 and rotational speed measuring device 8.

Evaluation unit 10 is configured to process measuring signals from force measuring device 7 and rotational speed measuring device 8 with the aid of software stored in evaluation unit 10. Moreover, evaluation unit 10 is configured to control a rotational speed of drive unit 9 as well as a manipulated variable of feed unit 6 with the aid of the software stored in evaluation unit 10, in particular as a function of the measuring signals of force measuring device 7 and rotational speed measuring device 8.

Dosing system 1 is furthermore equipped with a compressor 11, which is connected to evaluation unit 10 and is controllable thereby. Compressor 11 is connected to measuring unit 3.

Figure 2:
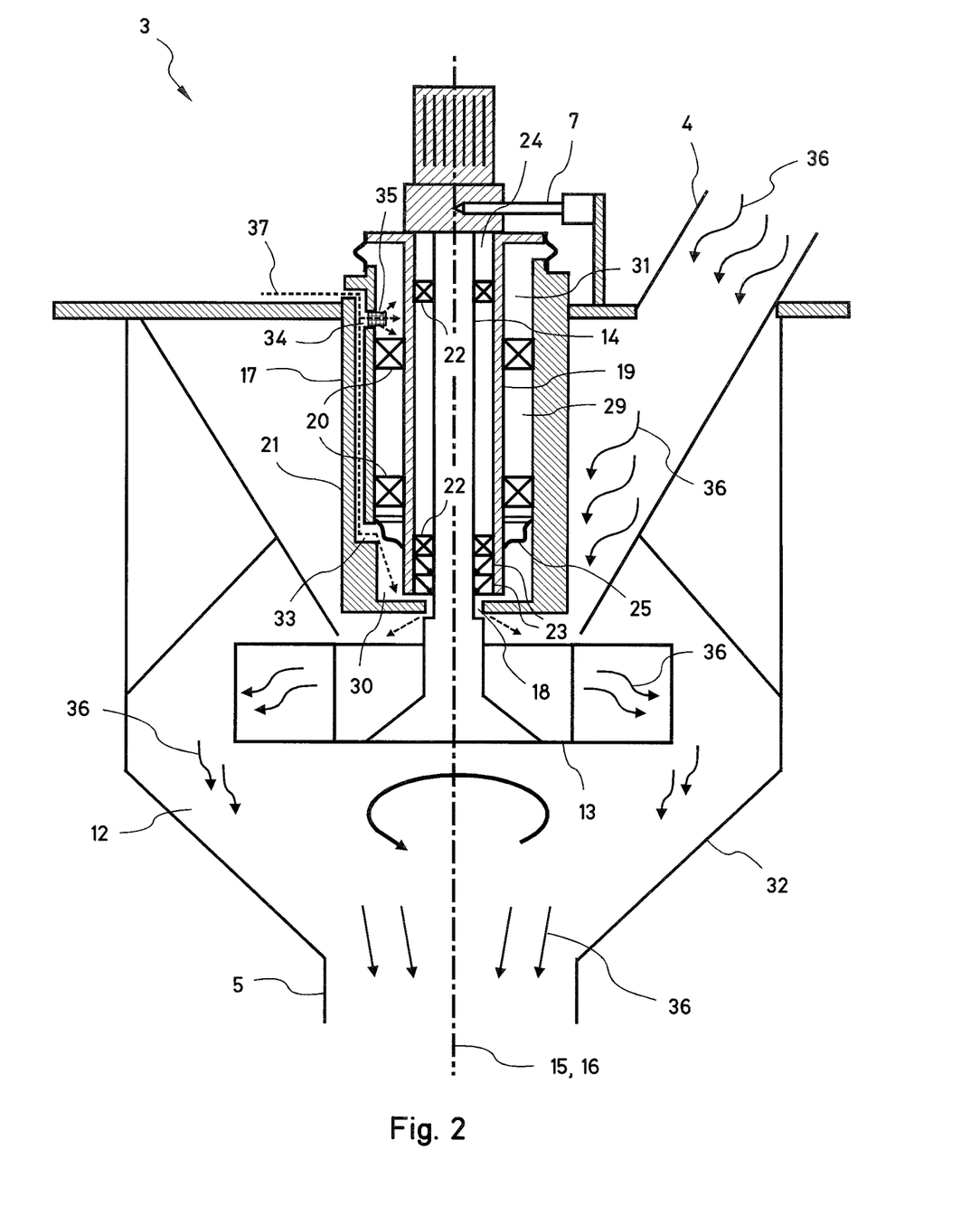
FIG. 2 shows the measuring instrument of the dosing system from FIG. 1 in a schematic sectional view.

FIG. 2 shows measuring instrument 3 from FIG. 1 in a schematic sectional view.

Measuring instrument 3 comprises a first housing 32 for conducting a material flow. This housing 32 has aforementioned inlet 4 and aforementioned outlet 5 (cf. FIG. 1). First housing 32 also includes a measuring wheel chamber 12, in which a rotatably mounted, bladed measuring wheel 13 of measuring instrument 3 is disposed.

Measuring instrument 3 also comprises a shaft 14 rigidly connected to measuring wheel 13 for driving measuring wheel 13, which is drivable with the aid of drive unit 9 of dosing system 1 (cf. FIG. 1). Shaft 14 has an axis of symmetry 15, which is simultaneously shared axis of symmetry 16 of shaft 14 and measuring wheel 13.

Measuring instrument 3 furthermore includes a second housing 17. This housing 17 is partially disposed within first housing 32 and has an opening 18, through which shaft 14 is inserted.

Measuring instrument 3 also includes an axially symmetrical bearing sleeve 19 for rotatably supporting shaft 14, which surrounds a part of shaft 14 and is partially disposed within second housing 17.

In the present exemplary embodiment, measuring instrument 3 has two bearings 20 designed as radial roller bearings, which are arranged between a wall 21 of second housing 17, which has a hollow cylindrical design and surrounds sleeve 19, and bearing sleeve 19. Bearing sleeve 19 is rotatably supported in second housing 17 with the aid of these two bearings 20.

In the present exemplary embodiment, measuring instrument 3 also includes two additional bearings 22 designed as radial roller bearings, which are arranged between bearing sleeve 19 and shaft 14. Shaft 14 is rotatably supported in bearing sleeve 19 with the aid of these two bearings 22.

Measuring instrument 3 further comprises two sealing elements 23, which are arranged between shaft 14 and bearing sleeve 19 and which seal a gap 24 between shaft 14 and bearing sleeve 19 dust- and gas-tight.

Measuring instrument 3 also includes another sealing element 25, which is fastened to second housing 17 and has a flexible part 26 (cf., for example, FIG. 3), which is in contact with bearing sleeve 19 along a circumferential line of bearing sleeve 19. This sealing element 25 has a front side 27 and a back side 28 (cf., for example, FIG. 5) and divides a gap 29 between bearing sleeve 19 and wall 21 of second housing 17 surrounding bearing sleeve 19 gas- and dust-tight into a first partial space 30 adjacent to front side 27 of sealing element 25 and a second partial space 31 adjacent to back side 28 of sealing element 25. Gap 29 between bearing sleeve 19 and wall 21 surrounding bearing sleeve 19 is sealed with the aid of this sealing element 25.

Second housing 17 comprises a first barrier gas inlet 33, via which a barrier gas may be introduced into first partial space 30, as well as a second barrier gas inlet 34, via which a barrier gas may be introduced into second partial space 31. The two barrier gas inlets 33, 34 are connected to compressor 11 from FIG. 1 via a gas line, which is not illustrated in the figures. In the present exemplary embodiment, second barrier gas inlet 34 includes an optional filter element 35 for filtering barrier gas.

During the operation of dosing system 1 from FIG. 1, measuring wheel 13 of measuring instrument 3 is driven with the aid of drive unit 9—for example, via a belt, which is not illustrated in the figures—in such a way that measuring wheel 13 rotates at a constant rotational speed.

If a material flow 36, for example a bulk material flow, is introduced into inlet 4 of measuring instrument 3 with the aid of feed unit 6, material flow 36 is conducted from first housing 32 to measuring wheel 13.

Material flow 36 strikes measuring wheel 13 from above and is deflected radially outwardly thereby. Based on the Coriolis principle, a braking torque, which is proportionate to the mass flow rate of mass flow 36, acts upon measuring wheel 13 and shaft 14. Mass flow 36 deflected by measuring wheel 13 is conducted from first housing 32 to its outlet 5, from where material flow 36 leaves first housing 32.

The braking torque acting upon shaft 14 according to the Coriolis principle is detected with the aid of force measuring device 7, force measuring device 7 generating a measuring signal dependent on the braking torque and thus also on the mass flow rate of mass flow 36 and transmitting the measuring signal to evaluation unit 10.

A measuring signal dependent on the rotational speed of measuring wheel 13 is generated by rotational speed measuring device 8 (not illustrated in FIG. 2) and transmits this measuring signal to evaluation unit 10.

Evaluation unit 10 ascertains the mass flow rate of material flow 36 based on the measuring signals which evaluation unit 10 receives from force measuring device 7 and rotational speed measuring device 8.

To obtain a defined mass flow rate of material flow 36 predefinable by a user, a manipulated variable of feed unit 6 from FIG. 1 is set to a suitable value by evaluation unit 10.

Measuring instrument 3 is supplied with a barrier gas 37 with the aid of compressor 11 from FIG. 1. Barrier gas 37 is introduced into first partial space 30 at an elevated pressure, for example at a pressure of 2 bar, via first barrier gas inlet 33. For example, air may be used as barrier gas 37.

Barrier gas 37 introduced into first partial space 30 flows out of second housing 17 through opening 18 of second housing 17, through which shaft 14 is inserted, out of first partial space 30 in the direction of measuring wheel 13. In this way, a penetration of particles, in particular bulk material particles, into second housing 17 is prevented or at least reduced. Barrier gas 37 generates no or only negligible friction forces at shaft 14.

The pressure of barrier gas 37 may be set as a function of the pressure prevailing in measuring wheel chamber 12. The pressure of barrier gas 37 is advantageously set in such a way that it is higher than the pressure in measuring wheel chamber 12.

The penetration of (bulk material) particles into second housing 17 may be avoided thereby, even in the case of a pressurized conveyance of material flow 36.

A possible deformation of sealing element 25 sealing gap 29 between second housing 17 and bearing sleeve 19, which is based on the elevated barrier gas pressure in first partial space 30, may result in that sealing element 25 rests against bearing sleeve 19 in such a way that sealing element 25 applies an undesirable friction/braking torque to bearing sleeve 19 during the operation of measuring instrument 3, which results in measurement errors.

To prevent flexible part 26 of sealing element 25 from being deformed due to the elevated barrier gas pressure in first partial space 30, barrier gas 37 is also introduced into second partial space 31 via second barrier gas inlet 34. In this way, the same barrier gas pressure is applied to front side 27 and back side 28 of sealing element 25, so that a pressure-induced deformation of flexible part 26 of sealing element 25 is avoided.

With the aid of sealing element 25 sealing gap 29 between second housing 17 and bearing sleeve 19, it is possible to prevent (bulk material) particles from penetrating this gap 29 in the case of an interruption or a failure of the barrier gas supply. Sealing element 25 is thus used, in particular, to protect the two bearings 20 arranged in gap 29 between second housing 17 and bearing sleeve 19.

Figure 3:
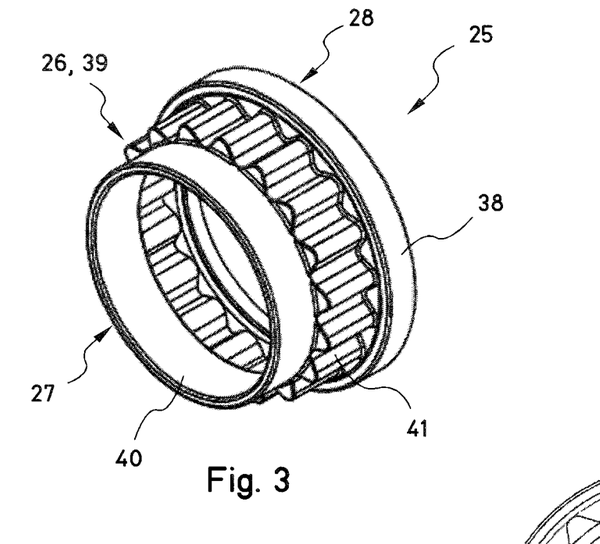
FIG. 3 shows a sealing element of the measuring unit of the dosing system from FIG. 2 in a perspective view.

FIG. 3 shows sealing element 25, which seals gap 29 between housing 17 and bearing sleeve 19 in measuring instrument 3 from FIG. 2, in a perspective view. In the present exemplary embodiment, sealing element 25 is designed as a sealing collar.

Sealing element 25 comprises a fastening piece 38 made from metal, in particular from high-grade steel. Sealing element 25 also comprises a sealing piece 39 made from silicone, which is connected to fastening piece 38, sealing piece 39 forming aforementioned flexible part 26 of sealing element 25.

Sealing piece 39 of sealing element 25 has a first section 40, which is provided with a hollow cylindrical design, as well as a second section 41, which has a corrugated ring shape. These two sections 40, 41 of sealing element 25 are designed to form a single piece with each other.

Figure 4:
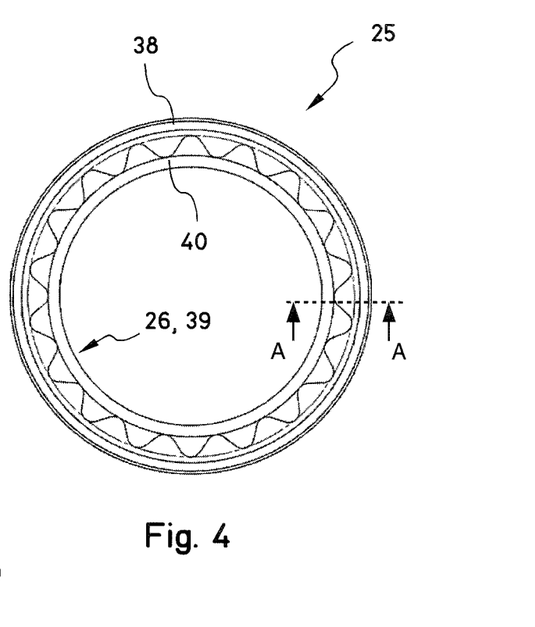
FIG. 4 shows the sealing element from FIG. 3 in a top view.

FIG. 4 shows sealing element 25 from FIG. 3 in a top view, the viewer facing front side 27 of sealing element 25.

Figure 5:
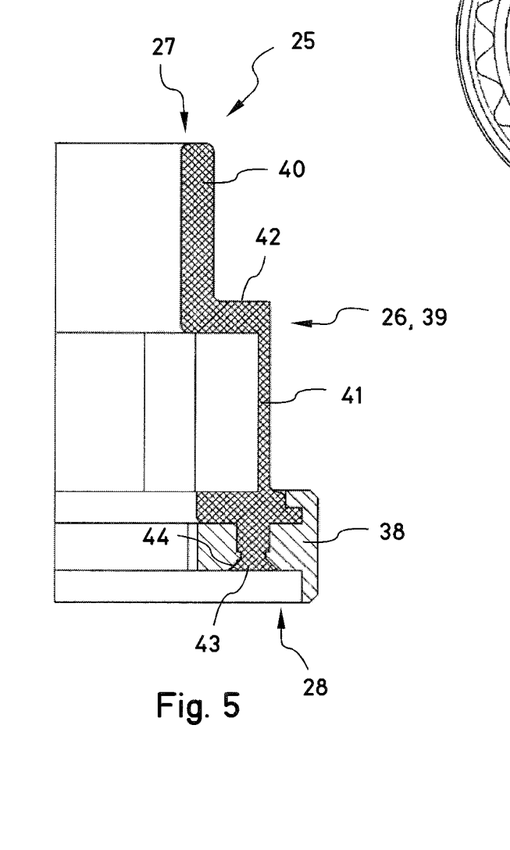
FIG. 5 shows a sectional view of the sealing element along sectional plane A-A from FIG. 4.

A section plane A-A is also drawn in FIG. 4, to which the sectional representation in FIG. 5 refers.

As is apparent, in particular, from FIG. 4, fastening piece 38 has a larger outer diameter than first section 40 of sealing piece 39. Moreover, fastening piece 38 has a larger inner diameter than first section 40 of sealing piece 39 (cf. FIG. 5).

FIG. 5 shows a sectional view of sealing element 25 along sectional plane A-A from FIG. 4.

As is apparent from FIG. 5, second section 41 of sealing piece 39 has a stepped transition 42, via which second section 41 abuts first section 40 of sealing piece 39.

In addition to the two aforementioned sections 40, 41, sealing piece 39 also has a third section 43, which is designed to form a single piece with the two sections 40, 41 mentioned first.

Sealing piece 39 is connected to fastening piece 38 via its third section 43, which is disposed in a groove 44 of fastening piece 38 in a form-fitting manner.

In measuring instrument 3 from FIG. 2, bearing sleeve 19 is inserted through sealing element 25, sealing piece 39 of sealing element 25 being in contact with bearing sleeve 19 with its first section 40 along a circumferential line of bearing sleeve 19.

In measuring instrument 3 from FIG. 2, fastening piece 38 of sealing element 25 is also fastened to second housing 17, sealing element 25 being arranged in such a way that sealing piece 39, in particular its first section 40, and fastening piece 38 have an axial symmetry with regard to axis of symmetry 15 of shaft 14, and front side 27 of sealing element 25 faces measuring wheel 13.

Figure 6:
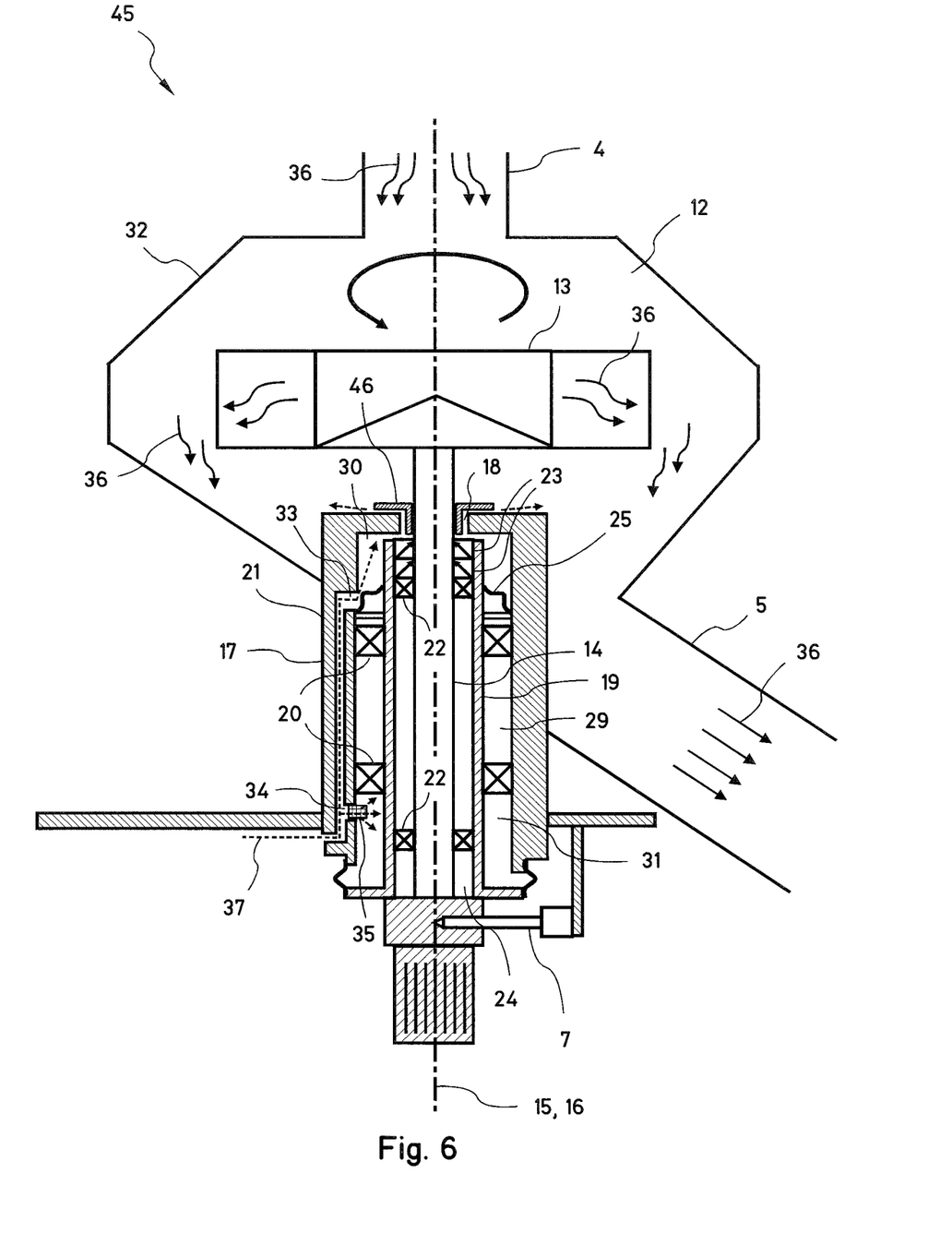
FIG. 6 shows another design variant of a measuring instrument for a dosing system in a schematic sectional view.

FIG. 6 shows a schematic sectional view of another design variant of an apparatus 45 for measuring a mass flow rate of a material flow, in particular a bulk material flow, according to the Coriolis principle. For the sake of simplicity, this apparatus is referred to below as measuring instrument 45.

Measuring instrument 45 from FIG. 6 may be used, for example, instead of measuring instrument 3 from FIG. 2 in dosing system 1 from FIG. 1.

The explanations below regarding measuring instrument 45 from FIG. 6 primarily refer to differences from measuring instrument 3 from FIG. 2, to which reference is made with regard to the same features and functions.

In measuring instrument 45 from FIG. 6, measuring wheel 13 is disposed above second housing 17. In addition, measuring instrument 45 includes a floating ring 46, through which shaft 14 of measuring instrument 45 is inserted.

Floating ring 46 is used to seal opening 18 of second housing 17 situated in measuring wheel chamber 12, through which shaft 14 is inserted, in particular in the case of an interruption or a failure of the barrier gas flow.

If the pressure difference between the pressure in first partial space 30 and the pressure in measuring wheel chamber 12 is above a predefined pressure value, barrier gas 37 may leave first partial space 30 via aforementioned opening 18. Floating ring 46 is held "in suspension" by the exiting barrier gas. A penetration of (bulk material) particles into gap 29 between bearing sleeve 19 and wall 21 of second housing 17 surrounding bearing sleeve 19 is prevented or at least reduced by exiting barrier gas 37.

If the pressure difference between the pressure in first partial space 30 and the pressure in measuring wheel chamber 12 drops below the predefined pressure value (for example, due to an interruption or a failure of the barrier gas supply), floating ring 46 automatically closes this opening 18 of second housing 17 and thereby prevents a penetration of (bulk material) particles into gap 29 between bearing sleeve 19 and wall 21 of second housing 17 surrounding bearing sleeve 19.

In the present design variant of measuring instrument 45, sealing element 25, which seals gap 29 between bearing sleeve 19 and wall 21 of second housing 17 surrounding bearing sleeve 19, is designed as illustrated in FIGS. 3 through 5.

The invention was described in detail based on the illustrated exemplary embodiments. However, the invention is not limited to or by the disclosed examples. Those skilled in the art may derive other variants from these exemplary embodiments without deviating from the idea underlying the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus comprising:
    a shaft;
    a bearing sleeve surrounding at least one part of the shaft for rotatably supporting the shaft;
    a housing, in which at least one part of the bearing sleeve is arranged; and
    a sealing element, which seals a gap between a wall of the housing and the bearing sleeve and which has a front side and a back side,
    wherein the sealing element divides the gap gas-tight into a first partial space adjacent to the front side of the sealing element and a second partial space adjacent to the back side of the sealing element,
    wherein the sealing element has a flexible part, which is in contact with the bearing sleeve, and
    wherein the housing has a first barrier gas inlet for introducing barrier gas into the first partial space as well as a second barrier gas inlet for introducing barrier gas into the second partial space.

2. The apparatus according to claim 1, further comprising at least one bearing for rotatably supporting the bearing sleeve in the housing, which is arranged between the bearing sleeve and the wall of the housing.

3. The apparatus according to claim 2, wherein the at least one bearing that is arranged between the bearing sleeve and the wall of the housing is disposed inside the second partial space.

4. The apparatus according to claim 1, wherein the bearing sleeve is inserted through the sealing element.

5. The apparatus according to claim 1, wherein the flexible part of the sealing element is in contact with the bearing sleeve along a circumferential line of the bearing sleeve.

6. The apparatus according to claim 1, wherein at least one of the first barrier gas inlet or the second barrier gas inlet comprises a filter element for filtering the barrier gas.

7. The apparatus according to claim 1, wherein the sealing element includes a fastening piece and a sealing piece connected to the fastening piece, the sealing piece forming the flexible part of the sealing element, and wherein the fastening piece is fastened to the wall of the housing.

8. The apparatus according to claim 7, wherein the fastening piece a is formed of metal, and the sealing piece is formed of an elastomer.

9. The apparatus according to claim 7, wherein the fastening piece has an axially symmetrical shape, and the sealing piece has a first section and a second section connected to the first section, wherein the first section is provided with a hollow cylindrical design, wherein the second section has a corrugated ring shape, and wherein the first and second sections of the sealing piece are designed to form a single piece with each other.

10. The apparatus according to claim 7, wherein the fastening piece has a larger outer diameter as well as a larger inner diameter than the sealing piece.

11. The apparatus according to claim 7, wherein the sealing piece has a section which is disposed in a groove of the fastening piece in a form-fitting manner.

12. The apparatus according to claim 1, further comprising a floating ring for sealing an opening of the housing through which the shaft is inserted, and wherein the shaft is inserted through the floating ring.

13. The apparatus according to claim 1, further comprising at least one bearing arranged between the shaft and the bearing sleeve with the aid of which the shaft is rotatably supported in the bearing sleeve.

14. The apparatus according to claim 1, further comprising a rotatably supported, bladed measuring wheel for deflecting a material flow, which is rigidly connected to the shaft, the front side of the sealing element facing the measuring wheel.

15. The apparatus according to claim 1, further comprising at least one additional sealing element, which seals a gap between the bearing sleeve and the shaft.

16. The apparatus according to claim 1, wherein the apparatus is a measuring instrument for measuring a mass flow rate of a material flow according to the Coriolis principle, and wherein the apparatus includes a force measuring device, which is configured to generate a measuring signal dependent on the mass flow rate of the material flow.

17. A measuring system comprising an apparatus according to claim 16, and comprising an evaluation unit, which is configured to ascertain the mass flow rate of the material flow using the measuring signal of the force measuring device.

18. A dosing system comprising:
   an apparatus according to claim 16;
   a feed unit for introducing the material flow into the apparatus; and
   an evaluation unit, which is configured to set a defined mass flow rate of the material flow by controlling or regulating a manipulated variable of the feed unit using the measuring signal of the force measuring device.

19. A method for operating an apparatus according to claim 1, the method comprising:
   introducing the barrier gas into the housing via the first barrier gas inlet and the second barrier gas inlet; and
   applying a same or essentially the same gas pressure to the back side of the sealing element, which seals the gap between the wall of the housing and the bearing sleeve, as is applied to the front side of the sealing element.

* * * * *